Oct. 22, 1940.    F. W. BLUEMEL    2,218,841
STEERING MECHANISM FOR VEHICLES
Filed Oct. 20, 1938

Frank William Bluemel
Inventor
Taubmin & Taubmin
Attorneys

Patented Oct. 22, 1940

2,218,841

UNITED STATES PATENT OFFICE 2,218,841

STEERING MECHANISM FOR VEHICLES

Frank William Bluemel, Wolston, near Coventry, England, assignor to Bluemel Bros. Limited, Wolston, near Coventry, England Application October 20, 1938, Serial No. 236,115
In Great Britain April 1, 1937

4 Claims. (Cl. 74—493)

This invention relates to steering mechanism for vehicles, and refers to that type of steering mechanism in which the steering wheel itself is adjustable in relation to the steering column, the mechanism including interengaging spigot and sleeve portions associated one with the steering wheel and the other with the steering column, the portions being nonrelatively rotatable but relatively slidable axially of the column so that the height or position of the wheel on the column may be adjusted in accordance with the requirements of the driver, suitable locking means being provided for securing the wheel in its adjusted position.

One form of steering mechanism of this type is described in the specification of reissue application No. 131,460, in which the sleeve portion is provided on the wheel and the steering column is provided with the spigot portion. Alternatively, the sleeve portion may be provided on the steering column and the spigot portion may be provided on the wheel.

With either construction as hitherto proposed, the wheel is preferably locked in relation to the steering column at the desired adjusted position by splitting the sleeve portion longitudinally and providing it with clamping means comprising a lever carried pivotally upon one end of a pin extending transversely through the split parts, the lever being provided at its pivot with a cam face adapted for engagement with an abutment associated with one of said parts, the other end of the pin being associated with the other of said parts, and the arrangement being such that on pivoting the lever the cam face engages one of the split parts to draw the split parts towards each other and contract the sleeve portion into clamping engagement with the spigot portion.

One of the objects of the present invention is to provide an alternative means for locking the wheel at the desired height.

Another object is to provide a cheaper and simpler form of locking means.

Referring to the drawing.

Figure 1:
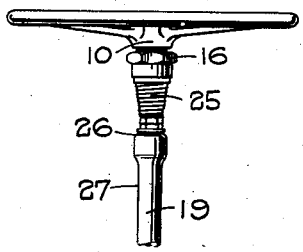
Figure 1 is a side elevation of one form of steering mechanism for a motor-car constructed in accordance with the present invention.
Figure 2:
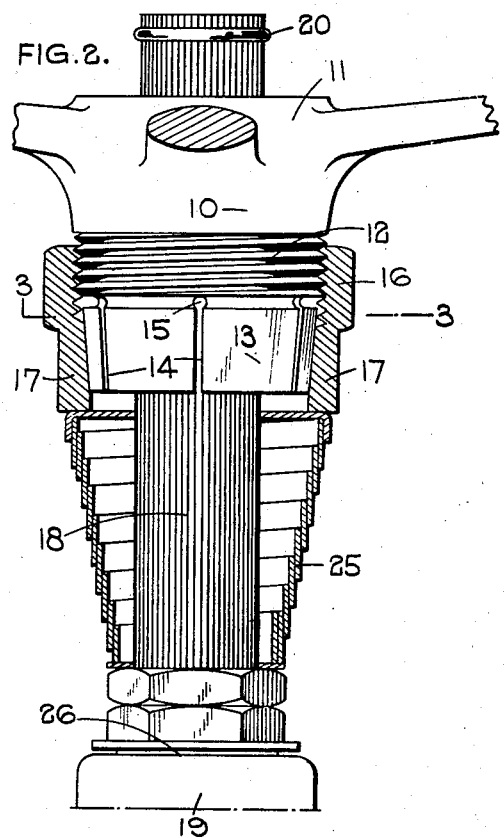
Figure 2 is an enlarged sectional view in side elevation of the same construction.
Figure 3:
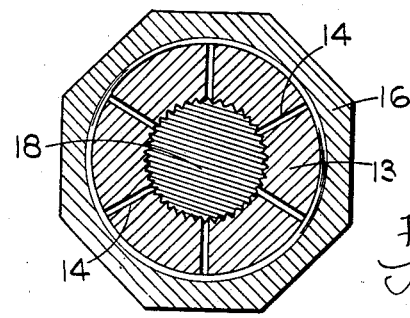
Figure 3 is a sectional plan view on the line 3—3 of Figure 1.

In the construction illustrated in Figures 1 to 3 the sleeve portion 10 is formed as an extension of the steering wheel hub 11 as is described in the specification of reissue application No. 131,460. The sleeve portion is threaded on its exterior as shown at 12 and provided with a part 13 coned on its exterior and made circumferentially contractible by splitting it longitudinally as shown at 14 at a number of points equally spaced around its periphery.

The splits extend from the end of the said coned part as far as the screw threads on the sleeve portion 10 and terminate in circular recesses 15 to facilitate the contraction of the coned part 13.

Screwing upon the threads 12 of the sleeve portion 10 is a locking nut 16 provided at one end with an extension 17 which is coned internally, the arrangement being such that when the nut is screwed on to the threads 12 the internally coned part 17 contracts the coned part 13 of the sleeve portion so that its internal surface can be brought into gripping or clamping engagement with the spigot portion 18 which, as is described in the said U. S. A. specification, is provided at the upper end of the steering column 19.

The exterior of the spigot portion 18 is splined as is shown clearly in Figures 2 and 3, as also is the interior of the sleeve portion 10 including the contractible part 13 thereof.

It is apparent that the effect of the recesses 15 is to weaken the metal at the junction between the upper portion of the coned part 13 and the threaded part 12, so that when the nut 16 is turned the interior splined surface of the coned part 13 will contract throughout its entire length about the spigot portion 18. Thus contact over a considerable area is effected between the coned part 13 and the spigot 18, which in turn, causes a rigid connection between the sleeve portion 10 and the spigot portion. In order further to weaken the metal at the upper portion of the sleeve 13, there may be provided a circumferential groove, preferably in a transverse line with the recesses 15. This groove assures additional weakening of the metal so as to provide an even tighter contact or contraction of the coned portion 13 about the spigot 18 when the nut 16 is turned or is rotated.

The spigot portion 18 extends through the hub 11 of the steering wheel and at the top it is provided with a ring 20 for the purpose of preventing the complete removal of the steering wheel when the nut 16 has been slackened.

With such a construction adjustment of the height of the steering wheel is effected by unscrewing the nut 16 from the sleeve portion 10 so as to permit of the contractible part 13 expanding, whereupon the steering wheel can be slidden on the spigot portion 18 to the particular height desired by the driver. The wheel is then locked in this position by tightening the nut 16 so that the coned part 17 thereof engages with the coned part 13 of the sleeve portion 10 and contracts it so that its splines are brought into close contact with the splines on the spigot portion 18 and the wheel is held rigidly in its adjusted position.

With the arrangement of locking means described, the locking pressure applied by the nut 16 to the contractible part 13 is substantially equal at all points around the spigot portion 18, a particularly even pressure being applied between the two sets of splines, so that the latter are subjected to the very minimum of wear during use.

A tubular shroud or shield 25 in the form of a volute spring is provided to co-operate with the sleeve portion 10 in enclosing the spigot portion 18 and thus hiding the splines thereof from view.

The sleeve portion 10 is of very short length, in fact of the same or only slightly greater length than the length of an ordinary non-adjustable steering wheel, so that modification of the design of the steering mechanism as compared with existing non-adjustable steering mechanisms is confined to the upper end of the steering column only.

The steering column is provided at a position a short distance below the steering wheel with a bearing 26 which serves to support rotatably the upper end of the steering shaft, the bearing being carried rigidly from an outer cover 27 indicated in Figure 1, which encloses the steering shaft.

The invention is, of course, applicable primarily to steering mechanism for motor road vehicles and the mechanism may be provided with controls arranged to move automatically axially with the wheel on adjustment thereof in the manner described in the specification of reissue application No. 131,460.

It should be understood that the application of the invention is not limited to steering mechanism for motor road vehicles, and it may be applied to other vehicles, for example, aircraft.

What I claim then is:

1. In steering mechanism for vehicles the combination of a steering wheel having a hub portion, a sleeve portion extending downwardly from the hub of said steering wheel and having longitudinally disposed splines in its bore, a parallel portion of said sleeve externally screwed, a tapered extremity portion of said sleeve, longitudinal slots in said tapered portion which is thereby divided into a plurality of arcuate portions, a nut engaging said parallel screwed portion and having an internally tapered portion engaging said exteriorly tapered sleeve portion and a steering column having a splined exterior passing through and engaging the correspondingly splined bore in the steering wheel hub.

2. In steering mechanism for vehicles the combination of a steering wheel having a hub portion, a sleeve portion extending downwardly from the hub of said steering wheel and having longitudinally disposed splines in its bore, a parallel portion of said sleeve externally screwed; a tapered extremity portion of said sleeve, longitudinal slots in said tapered portion which is thereby divided into a plurality of arcuate portions, said slots having enlargements at their roots, an annular groove in the exterior of said sleeve intermediate between the slotted tapered portion and the parallel screwed portion and at the position where the said enlargements are located, a nut engaging said parallel screwed portion and having an internally tapered portion engaging said exteriorly tapered sleeve portion, a steering column having a splined exterior, passing through and engaging the correspondingly splined bore in the steering wheel hub, and an annular collar located around the extremity of the steering column for the purpose of preventing the removal of the steering wheel from the column but permitting a limited axial adjustment of the wheel in relation to the column when the locking nut is released.

3. In steering mechanism for vehicles the combination of a steering wheel having a hub portion, a sleeve portion extending downwardly from the hub of said steering wheel and having longitudinally disposed splines in its bore, a parallel portion of said sleeve externally screwed, a tapered extremity portion of said sleeve, longitudinal slots in said tapered portion which is thereby divided into a plurality of arcuate portions, said slots having enlargements at their roots, an annular groove in the exterior of said sleeve intermediate between the slotted tapered portion and the parallel screwed portion and at the position where the said enlargements are located, a nut engaging said parallel screwed portion and having an internally tapered portion engaging said exteriorly tapered sleeve portion, a steering column having a splined exterior, passing through and engaging the correspondingly splined bore in the steering wheel hub, and means for preventing the complete removal of the wheel from the steering column when the locking means are released.

4. In steering mechanism for vehicles the combination of a steering wheel having a hub portion, a sleeve portion extending downwardly from the hub of said steering wheel and having longitudinally disposed splines in its bore, a parallel portion of said sleeve externally screwed, a tapered extremity portion of said sleeve, longitudinal slots in said tapered portion which is thereby divided into a plurality of arcuate portions, said slots having enlargements at their roots, an annular groove in the exterior of said sleeve intermediate between the slotted tapered portion and the parallel screwed portion and at the position where the said enlargements are located, a nut engaging said parallel screwed portion and having an internally tapered portion engaging said exteriorly tapered sleeve portion, a steering column having a splined exterior passing through and engaging the correspondingly splined bore in the steering wheel hub, an annular collar located around the extremity of the steering column for the purpose of preventing the removal of the steering wheel from the column but permitting a limited axial adjustment of the wheel in relation to the column when the locking nut is released, and a volute spring disposed around the steering column and having its upper extremity abutting against the underside of the locking nut and its lower extremity engaging an abutment on the steering column, said spring accomodating itself axially both to adjustments of the position of the steering wheel and to the position of the locking nut.

F. W. BLUEMEL.